Oct. 23, 1951  C. A. STEINKOENIG  2,572,531
DIVIDEND FIGURING SLIDE RULE
Filed April 10, 1951  2 SHEETS—SHEET 1

INVENTOR.
CHARLES A. STEINKOENIG
BY
McMorrow, Berman + Davidson
ATTORNEYS

Oct. 23, 1951 — C. A. STEINKOENIG — 2,572,531
DIVIDEND FIGURING SLIDE RULE
Filed April 10, 1951 — 2 SHEETS—SHEET 2
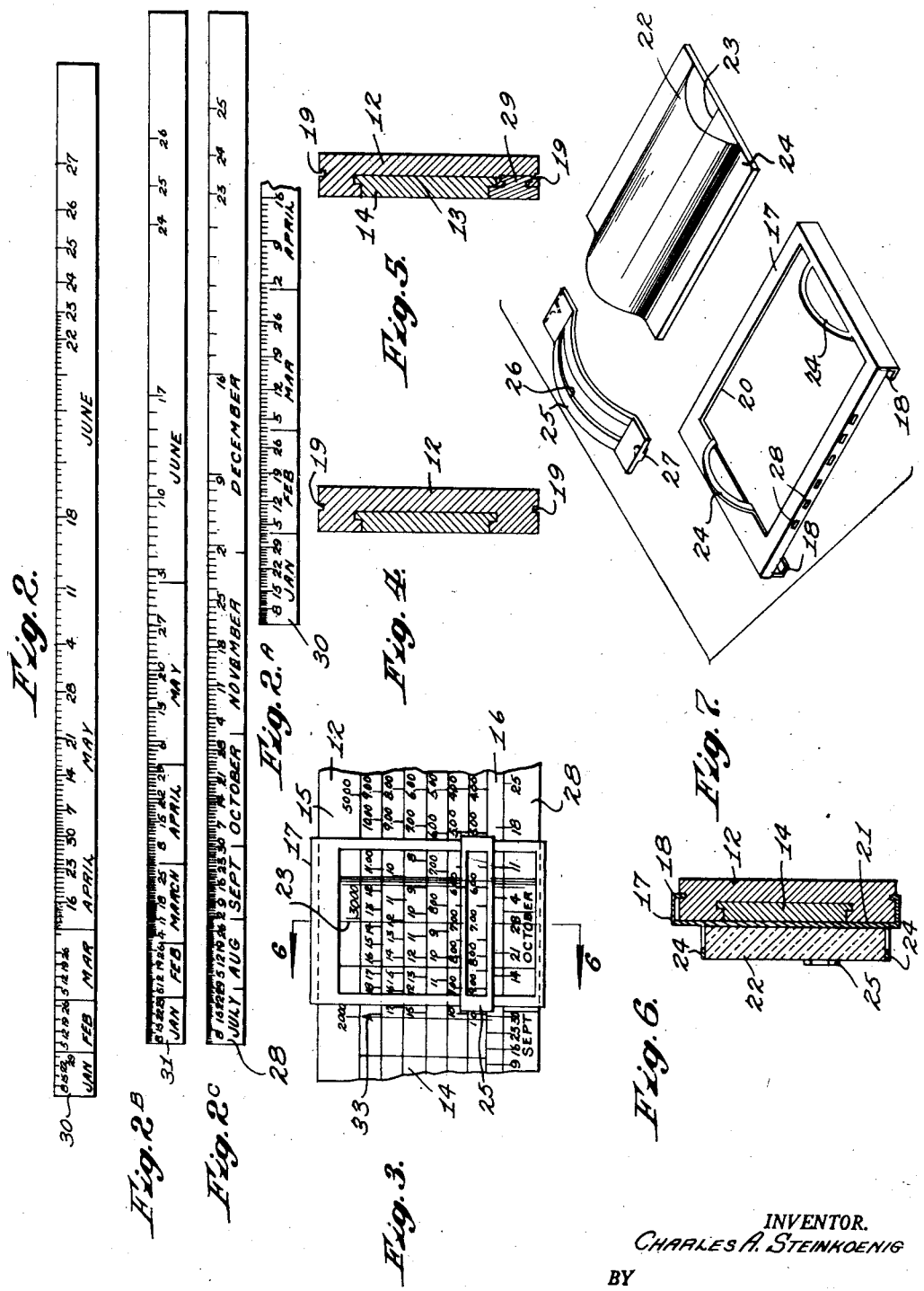
INVENTOR.
CHARLES A. STEINKOENIG
BY
McMorrow, Berman + Davidson
ATTORNEYS Patented Oct. 23, 1951

2,572,531

UNITED STATES PATENT OFFICE 2,572,531

DIVIDEND FIGURING SLIDE RULE

Charles A. Steinkoenig, Cincinnati, Ohio

Application April 10, 1951, Serial No. 220,207

4 Claims. (Cl. 235—70)

1

This invention relates to calculating devices, and more particularly to a slide rule device arranged for calculating dividends on deposits in savings accounts for various periods of time.

A main object of the invention is to provide a novel and improved dividend calculating device of simple construction, having relatively few parts, being easy to operate, and providing a means of determining the "average" of a deposit in a savings account, for determining the dividend received for the period of deposit thereof, and enabling numerical values of dividends for various rates of interest to be rapidly determined.

A further object of the invention is to provide an improved dividend calculating device which is inexpensive to manufacture, which provides accurate results, which provides a means of rapidly figuring the dividends on sums deposited at any date, and which is easy to manipulate.

Further objects and advantages of the invention will become apparent from the following description and claims, and from the accompanying drawings, wherein:

Figure 2 is a plan view of a calendar scale which may be employed in the device of Figure 1;

Figure 2a is an enlarged fragmentary view of the end portion of the calendar scale of Figure 2, illustrating the appearance of said scale under magnification as provided by the magnifying transparent viewing element on the slidable indicator of the device of Figure 1;

Figure 2b is a plan view of a calendar scale similar to that shown in Figure 2, but showing the scale adapted for use in a leap year in which the month of February has 29 days;

Figure 2c is a plan view of the calendar scale for the last six months of the year, which may be employed interchangeably with the calendar scale shown in Figures 2 and 2b;

Figure 3 is a fragmentary plan view of the indicator portion of the device of Figure 1, showing the indicator disposed over a portion of the main body of the device and illustrating the manner of using the device to determine a dividend;

Figure 4 is a cross-sectional view taken on the line 4—4 of Figure 1;

Figure 5 is a cross-sectional view taken on the line 5—5 of Figure 1;

Figure 6 is a cross-sectional view taken on the line 6—6 of Figure 3;

2

Figure 1:
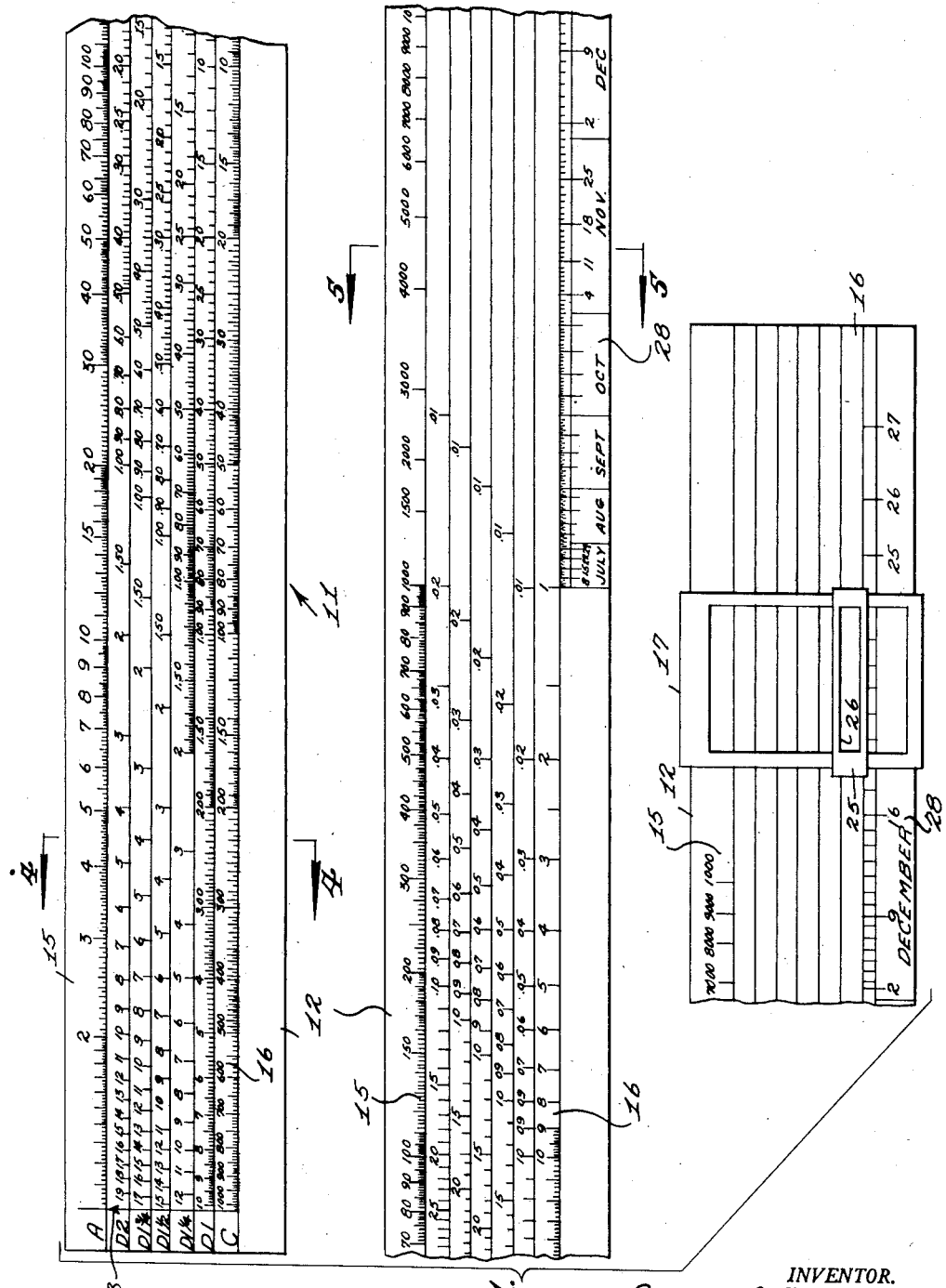
Figure 1 is a top plan view showing fragmentary portions of an improved dividend calculating device constructed in accordance with the present invention.

Figure 7 is a perspective view of the slidable indicator member employed in the device of Figure 1, the parts of the indicator member being shown in separated positions.

Referring to the drawings, the calculating device is designated generally at 11 and comprises an elongated flat body 12 formed with a longitudinal groove or guideway 13 in which is slidably disposed a slide rod 14. Inscribed on the upper marginal portion of the body 12 immediately above and adjacent to the slide rod 14 is a first scale 15 representing sums deposited in a savings account, the numerical scale 15 extending longitudinally along the body 12 from the left end to the right end of said body, as viewed in Figure 1, the scale 15 being identified by the letter "A" inscribed in the left upper corner of the body 12 in alignment with the scale 15, as shown in Figure 1. Inscribed on the lower portion of the body subadjacent to the slide rod 14 is a second numerical scale 16 representing the "average" of a sum deposited over a period of six months. The term "average" means the proportion of the amount deposited in an account which receives a dividend for the entire six months' period, namely, the equivalent amount which if deposited for a period of six months would earn the same dividend as a given amount would earn deposited for a period of less than six months. The "average" scale 16 is identified by the capital letter "C" inscribed at the left end of the body 12 aligned with the scale 16.

Inscribed on the slide rod 14 are a plurality of dividend scales, identified by the indicia "D1," "D1¼," "D1½," "D1¾," and "D2," as shown in Figure 1. Each one of the scales on the slide rod 14 represents the dividends earned by given "average" sums at different rates of interest, as for example, the "D1" scale represents dividends earned at a rate of 1%, the "D1¼" scale represents dividends earned at an interest rate of 1¼%, the "D1½" scale represents dividends earned at an interest rate of 1½%, and so forth.

Designated at 17 is a slidable indicator member which is slidably engaged on the body 12 for movement longitudinally therealong, the indicator member 17 having inturned flanges 18, 18 which engage in longitudinal grooves 19, 19 formed in the longitudinal edges of the body 12. The indicator 17 is generally rectangular in shape and is formed with a rectangular aperture 20 over which is secured a transparent rectangular window 21 on which is transversely cemented a transparent, cylindrical lens element 22. The bottom surface of the transparent window member 21 is inscribed with the transverse hairline 23. As shown in Figure 7, the indicator member 17 is formed with the upstanding arcuate securing lugs 24, 24 located at the ends of the aperture 20 to facilitate the securement of the lens 22 to the main body of the indicator. Designated at 25 is an apertured mask member which is disposed over the indicator 17 in overlying relationship to the lens 22, said mask being formed with the slot 26 extending longitudinally relative to the main body 12 of the calculating device. The ends of the mask member 25 are formed with the inturned hook elements 27 adapted to engage in detent recesses 28 formed in the transverse margins of the indicator 17 to lock the mask member 25 in respective positions overlying the different dividend scales on the slide rod 14, the mask member 25 being formed of spring metal or other suitable resilient material allowing the mask member to be moved along the main body of the indicator from one position to another corresponding to respective different rates of interest. For example, the mask member 25 is located in overlying relationship to the "D1" dividend scale in Figures 1 and 3. The mask member may be disengaged from its first position and moved into a position overlying any one of the other dividend scales by merely moving it transversely on the indicator member 17.

Designated at 28 is a calendar scale which is provided on the right end portion of the body 12, said calendar scale comprising a detachable body which is provided with a dovetailed rib, such as the rib shown at 29 in Figure 5, interlocking with a correspondingly shaped longitudinal groove formed in the lower portion of the body 12 at the right side thereof, as viewed in Figure 1. The scale 28 is inscribed with the months of the year beginning with July and ending with December, and is divided up into divisions corresponding to the different days of the various months, as shown in Figure 1. Figures 2, 2b and 2c show three different scales which may be employed with the calculating device. The scale shown in Figure 2c is the scale 28 of Figure 1. Figure 2 represents a scale which is mechanically interchangeable with the scale 28, the scale of Figure 2 being designated at 30. Scale 30 carries the six months of the year from January through June, and is divided up into divisions corresponding to the days of each of the various months, the month of February having 28 days. Designated at 31 in Figure 2b is another calendar scale similar to the scale 30 of Figure 2, but wherein the month of February has 29 days for use in a leap year. Figure 2a illustrates the magnification of the scale 30 which occurs where such scale is viewed through the lens 22, the scale appearing to be elongated longitudinally by the effect of said lens. The scales 28, 30 and 31 are of course interchangeable and may be employed in the calculating device for calculating dividends corresponding to the six months' period represented by each of the respective scales.

It will be noted that the slide rod 14 is provided at its upper left end, as viewed in Figure 1, with an index pointer 33. In using the device, the slide rod 14 is moved so that the index pointer 33 is positioned adjacent the value on the scale 15 corresponding to the sum deposited in the account. The indicator 17 is then moved so that the hairline 23 is positioned over the calendar scale at a point corresponding to the date on which the deposit was made. The "average" amount associated with the amount deposited on said date is then read directly from the scale 16 along the hairline 23. The dividend earned by the deposited amount may be read directly from the associated dividend scale along the hairline 23 in this position. For example, assume that an amount of $2,000 was deposited on October 28 of a given year. As shown in Figure 3, the index pointer 33 is set opposite 2,000 on the scale 15 and the hairline 23 of the indicator is set to a position corresponding to October 28 on the calendar scale 28. The "average" amount is then read on the scale 16, if so desired, and the dividend earned may be read directly by observing the value on the appropriate dividend scale of slide rod 14 which appears below the hairline 23 in the aperture 26 of the mask member 25. With the mask member set as in Figure 3, the value of earned dividend obtained from the above operation of the device will be $6.92. This corresponds to a dividend rate of 1%.

To obtain the dividend for any one of the other different rates of interest, it is merely necessary to move the mask member 25 to a position overlying the corresponding dividend scale on the slide rod 14.

To obtain the dividend value for any six months' period, it is merely necessary to insert the appropriate calendar scale 28, 30 or 31 in the groove provided therefor in the body 12 of the device.

While a specific embodiment of an improved dividend computing device has been disclosed in the foregoing description, it will be apparent that various modifications within the spirit of the invention may occur to those skilled in the art. Therefore, it is intended that no limitations be placed on the invention except as defined by the scope of the appended claims.

What is claimed is:

1. A dividend computing slide rule comprising an elongated flat body formed with a longitudinal guideway, a first numerical scale representing sums deposited extending longitudinally along the body on one side of said guideway, a second numerical scale representing average dividend-earning sums extending longitudinally along the body on the other side of said guideway, a slide rod slidably mounted in said guideway, a numerical scale representing dividends earned extending longitudinally on said slide rod, a calendar scale on said body extending longitudinally thereon, and an indicator slidably mounted on said body for longitudinal movement therealong, said indicator including a transparent window portion having a hairline extending transversely across the flat body and the slide rod.

2. A dividend computing slide rule comprising an elongated flat body formed with a longitudinal guideway, a first numerical scale representing sums deposited extending longitudinally along the body on one side of said guideway, a second numerical scale representing average dividend-earning sums extending longitudinally along the body on the other side of said guideway, a slide rod slidably mounted in said guideway, respective spaced numerical scales representing dividends earned at respective rates of interest extending longitudinally on said slide rod, a calendar scale on said body extending longitudinally thereon, an indicator slidably mounted on said body for longitudinal movement therealong, said indicator including a transparent window portion having a hairline extending transversely across the flat body and the slide rod, and an apertured mask member slidably mounted on said indicator for transverse movement thereover, said mask member being selectively movable into vertical registry with the respective dividend scales.

3. A dividend computing slide rule comprising an elongated flat body formed with a longitudinal guideway, a first numerical scale representing sums deposited extending longitudinally along the body along one side of said guideway, a second numerical scale representing average dividend-earning sums extending longitudinally along the body on the other side of said guideway, a slide rod slidably mounted in said guideway, respective spaced numerical scales representing dividends earned at respective rates of interest extending longitudinally on said slide rod, a calendar scale on said body extending longitudinally thereon, an indicator slidably mounted on said body for longitudinal movement therealong, said indicator including a transparent window portion having a hairline extending transversely across the flat body and the slide rod, an apertured mask member slidably mounted on said indicator for transverse movement thereover, said mask member being selectively movable into vertical registry with the respective dividend scales, transversely spaced detent recesses on the indicator, and a detent element on said masked member lockingly engageable in said recesses.

4. A dividend computing slide rule comprising an elongated flat body formed with a longitudinal guideway, a first numerical scale representing sums deposited extending longitudinally along the body on one side of said guideway, a second numerical scale representing average dividend-earning sums extending longitudinally along the body on the other side of said guideway, a slide rod slidably mounted in said guideway, respective spaced numerical scales representing dividends earned at respective rates of interest extending longitudinally on said slide rod, a calendar scale on said body extending longitudinally thereon, an indicator slidably mounted on said body for longitudinal movement therealong, said indicator including a transparent window portion having a hairline extending transversely across the flat body and the slide rod, an apertured mask member slidably mounted on said indicator for transverse movement thereover, said mask member being selectively movable into vertical registry with the respective dividend scales, said mask member being of resilient material and being flexible longitudinally relative to the flat body, the transverse edges of the indicator being formed with spaced detent recesses, and respective inwardly extending projections carried by the ends of the mask member lockingly engageable in said recesses, said recesses being arranged to cooperate with said projections to yieldably secure the masked member in vertical registry with the respective dividend scales.

CHARLES A. STEINKOENIG.

No reference cited.